United States Patent [19]

Diller

[11] Patent Number: 4,712,302

[45] Date of Patent: Dec. 15, 1987

[54] TUBE CUTTER WITH RELEASABLE DRIVE

[75] Inventor: Charles E. Diller, Springfield, Ohio

[73] Assignee: Dresser Industries, Inc., Dallas, Tex.

[21] Appl. No.: 902,439

[22] Filed: Aug. 29, 1986

[51] Int. Cl.$^4$ .............................................. B26D 3/16
[52] U.S. Cl. ........................................ 30/107; 72/122
[58] Field of Search ................... 30/105–108; 72/122, 123; 29/157.4, 157.5

[56] References Cited

U.S. PATENT DOCUMENTS

| | | | |
|---|---|---|---|
| 560,099 | 5/1896 | Kranzer | 30/107 |
| 695,482 | 3/1902 | O'Neill et al. | 30/107 |
| 906,797 | 12/1908 | Hawkins | 30/107 X |
| 3,854,314 | 12/1974 | Martin | 72/122 |
| 4,134,286 | 1/1979 | Martin | 72/122 |

OTHER PUBLICATIONS

Airetool, Tube Cleaners Tube Expanders Catalog CE-102, Dresser Industries, Inc. (pp. 3, 27–31, & 40–41, esp. p. 28).

Kotthaus & Bush, K&B Tube Tools, K&B Expansion Controls Catalog R3, May 82, (pp. 48–49).

Primary Examiner—Douglas D. Watts

[57] ABSTRACT

The invention provides a tube cutter of the type which forces a tool bit against an interior tube wall as the bit is rotated to sever the tube from the inside. The inventive tool cutter comprises a housing for holding the tool bit at a distance from the tube end as the tool bit is rotated; a feed shaft positioned by the housing for converting axial force along the feed shaft into radially directed pressure forcing the tool bit outwardly against the interior tube wall at the distance from the tube end as the tool bit is rotated; a drive means positioned by the housing for releaseable drive engagement with the feed shaft, the drive means having a released non-feed position and an engaged feed position in which axial force is applied to the feed shaft; means positioned by said housing for actuating the drive means between the released position and the engaged position; and means positioned by the housing for limiting the maximum axial force applied by the drive means to said feed shaft so that the maximum radial force on the tool bit is limited.

14 Claims, 7 Drawing Figures

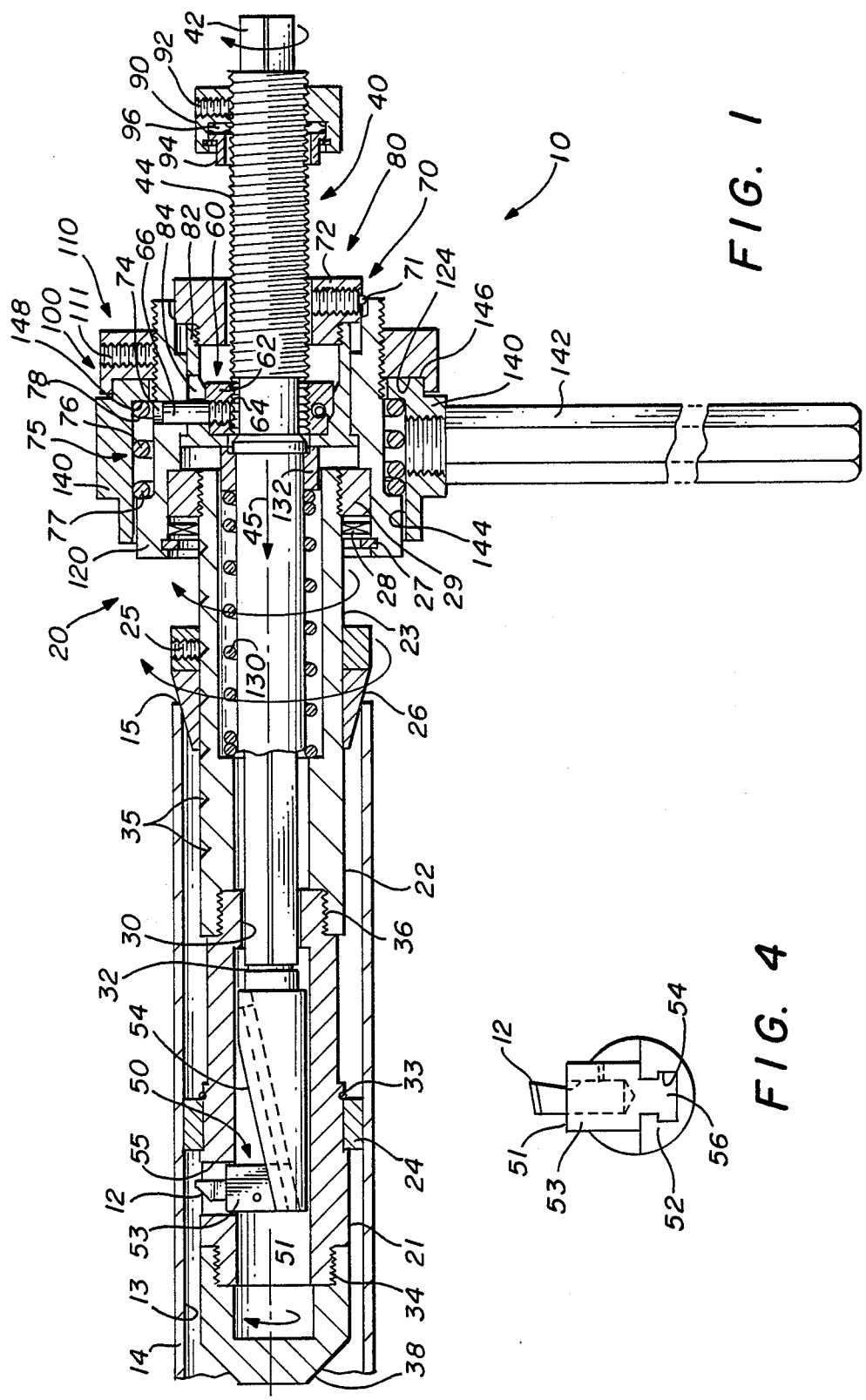

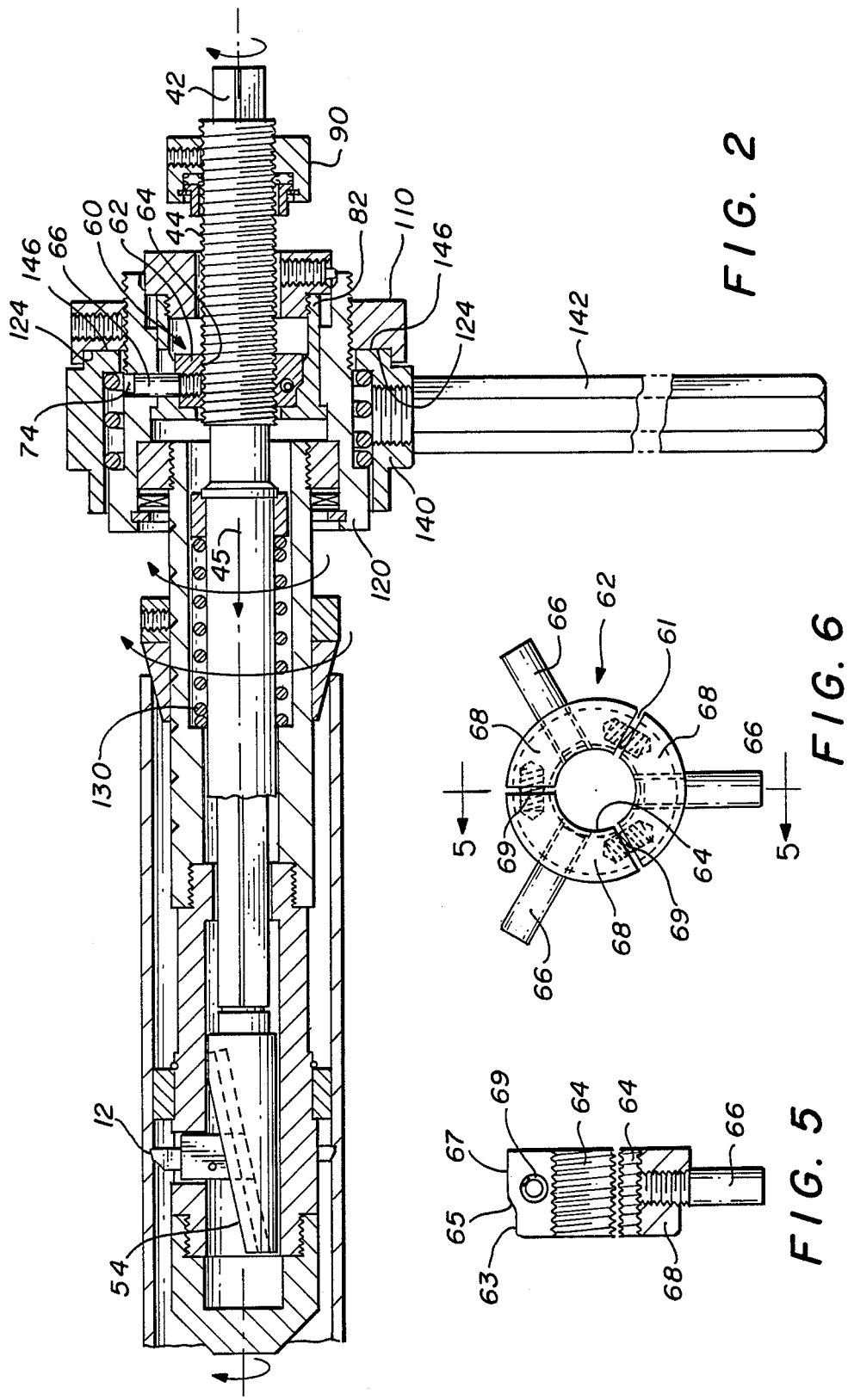

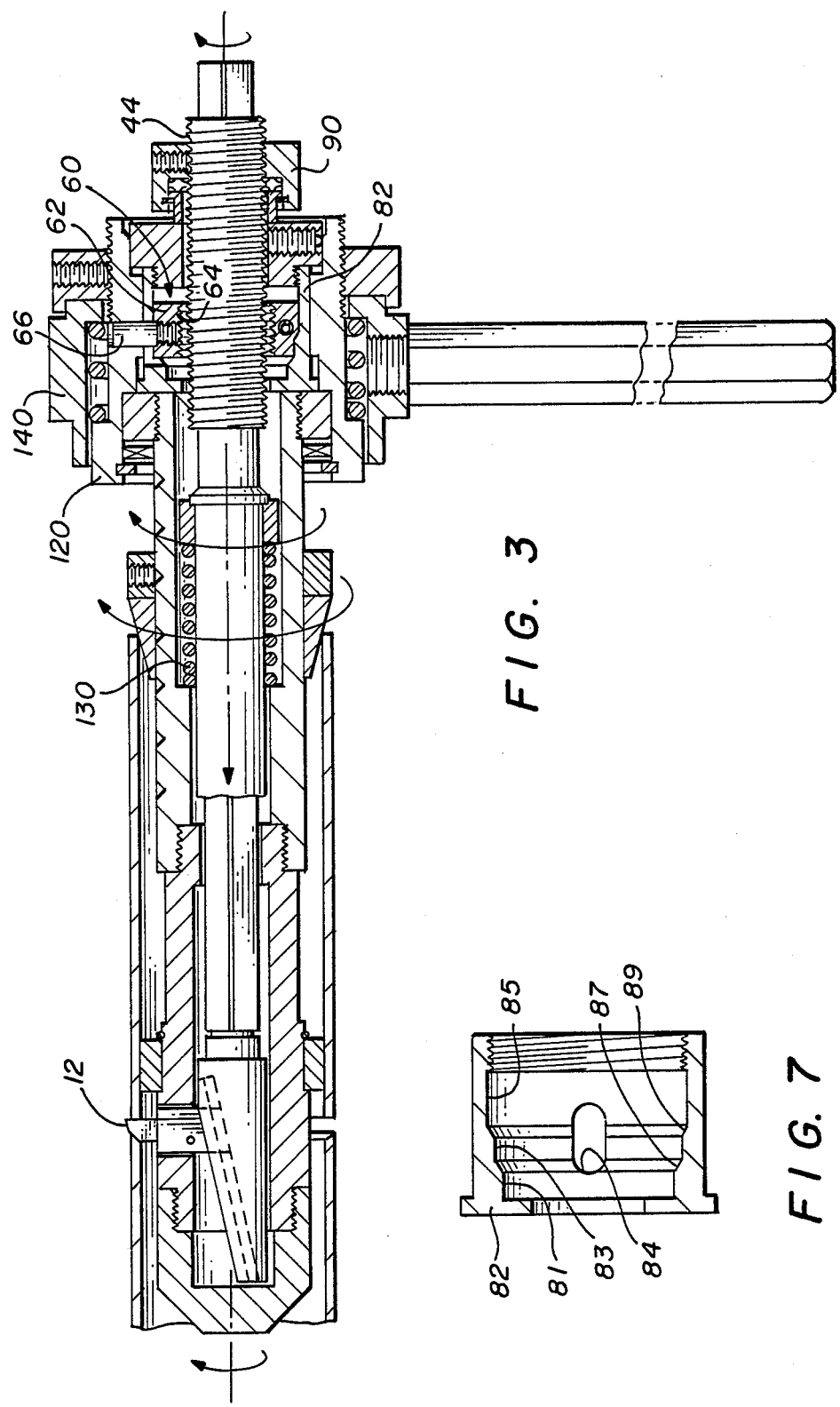

TUBE CUTTER WITH RELEASABLE DRIVE

BACKGROUND OF THE INVENTION

This invention relates generally to an improved tube cutter. More particularly, but not by way of limitation, this invention relates to an internal tube cutter to sever the tube using radial pressure on a tool bit applied against the tube wall as the cutter is rotated.

An example of prior art tube cutters includes a push type tube cutter, Model No. PIC 2000 manufactured by the Air Tool Division of Dresser Industries, Inc. Such a tool is manually operated. The operator manually pushes on a driver to activate the tool bit. Another example is a partially automatic tool bit feed internal tube cutter type KR68 offered by Kotthaus & Busch. It has a clutch which is manually inserted into a pawl by a holding lever and the feed is thus started. A threaded nut and cage arrangement push a mandrel forward to cause the pawl to move out of engagement with clutch dog 8 and against pins which in turn release a spring. The released spring pushes one end of a pivoted knife blade by means of a rod through the center of the tube cutter. The spring force thus pushes the knife or tool bit into the interior tube wall as it is rotated until the tube has been cut. To disengage the tube cutter, the threaded nut must be manually turned in the opposite direction by hand as far as it will go until all the blade is withdrawn and all the parts are returned to the starting position.

The prior art tube cutters have disadvantages including only partially automatic operation as the feed must be manually engaged and as disengagement requires manually unthreading a nut.

If the relative positioning between the pawl and the adjustment collar is not proper then the clutch will not disengage and the spring will not be released such that the tool will be driven by direct drive of the threaded nut thereby often causing tool breakage.

Other disadvantages may include uneven cutter pressure provided by the operator of a manual tool which may result in tool breakage. Also, after the tool bit completes its cut it must be manually disengaged.

One object of the present invention is to provide an automatic feed tube cutter which reduces or overcomes these and other disadvantages as will become more apparent in the description which follows.

SUMMARY OF THE INVENTION

This invention provides a tube cutter of the type which forces a tool bit against an interior tube wall as the bit is rotated to sever the tube from the inside. The tube cutter comprises a housing for holding the tool bit at a predetermined distance from the end of the tube as the tool bit is rotated. A feed shaft is positioned by the housing for converting axial force along the shaft into radially directed pressure forcing the tool bit outwardly against the interior tube wall at the predetermined distance from the tool end as the tool bit is rotated. A drive is positioned by the housing for releasable driving engagement with the feed shaft and has a released nonfeed position and an engaged feed position in which axial force is applied to the feed shaft. The drive is actuated between the released position and the engaged position by an actuator. Also the maximum axial force applied by the drive to the feed shaft is limited so that the maximum radial force on the tool bit is limited.

BRIEF DESCRIPTION OF THE DRAWINGS

The foregoing and additional objects and advantages of the invention will become more apparent as the following detailed description is read in conjunction with the accompanying drawings, wherein like reference characters denote like parts in all views and wherein:

FIG. 1 is a plan view of the inventive tube cutter in partial cross-section shown in a rest position prior to beginning tube cutting operation;

FIG. 2 is a plan view of the tube cutter in partial cross-section shown inserted into the tube to be cut and shown in feed engaged position where the tool bit is in contact with the interior tube wall;

FIG. 3 is a plan view in partial cross-section of the tube cutter in which the tool bit has completed its cut through the tube to be cut and the feed means has automatically moved to its disengagement position;

FIG. 4 is an end view of a wedge-shaped track, tool holder, and tool of a preferred embodiment of a means for converting axial force along the feed shaft into radially directed pressure forcing the tool bit outwardly;

FIG. 5 is a sectional view of the drive means of the invention taken along section line 5—5 of FIG. 6;

FIG. 6 is an end view of the drive means of the invention with hidden lines showing the details of internal construction; and FIG. 7 is a sectional side view of the means for actuating the drive means of the invention with the cross-section taken along a plane which passes through the axis of the tubular actuating means of the preferred embodiment of the invention.

DETAILED DESCRIPTION OF THE PREFERRED EMBODIMENT

Referring to the drawings and to FIG. 1 in particular, the tube cutter is generally designated by numeral 10 and is shown in its initial position inside tube 14 which with tool bit 12 adjacent interior tube wall 13 so that it may be rotated and pushed outwardly to sever the tube wall from the inside. A housing generally designated 20 is shown for holding tool bit 12 at a distance from tube end 15. The distance may be a fixed distance or an adjustable distance predetermined either prior to installing or during the installation procedure. In the preferred embodiment the distance is set using spacing means 26 which may be a conical collar 26 adapted for spacing the tool axially as well as radially from the end 15 of tube 14 to be cut. An adjustment means such as set screw 25 may be used to adjustably locate the collar 26 to adjustably set the depth.

A feed shaft means 40 is positioned by housing 20 for converting axial force along the feed shaft 40 into radially directed pressure forcing the tool bit 12 outwardly against the interior tube wall 13 at the distance from the tube end 15 as the tool bit is rotated. The housing generally designated 20 comprises a tubular member 22 having a front portion 21 and a back portion 23. Further, it comprises a pilot means 24 attached to the tubular member front portion 21 for supporting the tubular member front portion 21 centered in the tube 14 to be cut. Preferably the pilot means 24 is positioned between the tool bit 12 and the spacing means 26. In the preferred embodiment spacing means 26 has a conical outer surface shape which expands from a diameter smaller than the inside diameter of the tube to a diameter larger than the diameter of the inside of the tube such that the end of the tube abuts against the conical surface of spacing means 26 thereby centering it.

A bearing means 28 in the housing 20 is coupled to the tubular member 22 back portion 23. A feed body 120 is coupled to the bearing means 28 for rotatably supporting the tubular member 22 therethrough. Feed body 120 also carries means 80 for actuating the drive means 60 from the engaged position (as shown in FIG. 2) to the released position (as shown in FIG. 3). A first frictional surface 124 is formed on feed body 120. A stationary collar 140 is coupled to the feed body 120 and has means 142 attached thereto for preventing the stationary collar 140 from rotating. The stationary collar 140 has a second frictional slip surface 146 frictionally interfaced with the first frictional slip surface 124 on the feed body 120 so that rotation of the feed body is restricted.

Tubular member 22 is preferably constructed of rigid metallic material such as steel. It may be advantageously formed of multiple tubular sections which are fastened together in axial alignment with each other as by threaded engagement at 34 by which the front end portion 21 is attached to a nose cover 38 and as by threaded section at 36 by which the rear end portion 23 is attached to front end portion 21. Detents 35 may be formed or placed as by partial hole drilling along the exterior surface of rear end portion 23 for engagement with set screw 25 to adjust the depth of the tool.

Pilot means 24 may be a pilot ring 24 such as a cylindrical band of a substantially rigid wear resistant material which preferably may be a bearing material such as steel, brass, Babbitt, nylon or the like which is sized to fit the inside diameter of the tube 14 and the outside diameter of front end portion 21 of the tubular member 22 and which may be held in place by any conventional means or as in the preferred embodiment replaceably held in place by removable lock ring 33.

Bearing means 28 which is coupled to tubular member back portion 23 is sized and positioned by methods known to those skilled in the art to support tubular member 22 for rotation with respect to feed body 120. For example, bearing 28 may be an anti-friction roller or ball bearing 28 which has one race abutting against a collar rigidly affixed to tubular member 22 and a second race spaced apart from tubular member 22 and abutting against a lock ring which is rigidly attached to feed body 120. Appropriate clearance is provided between the collar abutting the first race and the feed body 120 so that relative rotation is permitted through anti-friction bearing 28. Feed body 120 thus supports tubular member 22 through bearing 28.

Also, feed body 120, in the preferred embodiment, carries means 80 for actuating the drive means 60 from the engaged position to the released position. The initial or at rest position is shown in FIG. 1, the engaged position is shown in FIG. 2, and the released position is shown in FIG. 3.

It is also seen from FIGS. 1, 2 and 3 that in the preferred embodiment, first frictional surface 124 formed on feed body 120 is a radially extending surface formed on collar 110. Collar 110 is positionable in an axial direction along feed body 120 and adjustably locateable thereon so that it does not rotate with respect to feed body 120, as by set screw 111. Advantageously, collar 110 may be adjustably located as by threaded engagement with feed body 120 so that its position may be set by loosening set screw 111 and rotating collar 110 on the threads with respect to feed body 120.

The stationary collar 140 which is coupled to feed body 120 in the preferred embodiment has means 142 attached thereto for preventing the stationary collar 140 from rotating. In the preferred embodiment means 142 is a handle 142 which is rigidly fastened radially extending from stationary collar 140. During operation of the tube cutter 10, handle 142 would be held by the operator or abutted against a stationary object adjacent the tube to be cut.

To convert axial force along shaft 40 into radially outward force on tool bit 12 means 50 is attached to feed shaft 40. As shown feed shaft 40 has rotational coupling means 42 which may be a square or hexnut affixed or integrally formed at the end of shaft 40. A corresponding socket attached to a rotational power source (not shown) may be slipped onto rotational coupling means 42 to provide rotational power. The source of rotational power, as will be understood by those skilled in the art, could be any known rotational power source such as an electrical drill motor or a pneumatic or a hydraulic powered rotational device. Threads 44 are formed on shaft 40 for engagement with drive means 60 so that a portion of the rotational power received by the rotational coupling means is transformed into axial force, as depicted by arrow 45, along feed shaft 40. Thus, by spinning shaft 40 while the threads are engaged with drive means 60, the shaft is driven axially in the direction shown at arrow 45.

Means 50, for converting axial force into radial tool pressure is, in the preferred embodiment, a wedge 52 coupled at end 32 of feed shaft 40. Wedge 52 has a slide track 54 formed therein at an angle along its length. The tool bit holder 51 has a corresponding track follower 56 formed on one side thereof sized for sliding engagement with the angled slide track 54. Tool bit holder 51 further has a smooth exterior surface 53 sized for engagement with smooth orifice 55 formed in tubular member front portion 21. Thus, shaft 40 is driven in the direction of arrow 45 relative to tubular member 22 thereby driving wedge 52 to the left with respect to tool holder 53 so that the tool bit holder 51 is "wedged up" track 54 thereby providing radial force 47 to punch tool 12 against tube wall 13. The operation described above may be understood with reference to FIGS. 1, 2 and 3 concurrently. Each figure shows shaft 40 at a different driven axial locations. In FIG. 1, tool bit 12, is not in contact with tubular wall 13. In FIG. 2 tool bit 12 is in cutting engagement with tube wall 13. In FIG. 3 tool bit 12 has completely severed tube 14.

In the preferred embodiment, the drive means 60 further comprises an expandable collet 62 having threads 64 at least partially therethrough for engagement with threads 44 on feed shaft 40. By manually moving shaft 40 only slightly in the direction of arrow 45 while simultaneously rotating shaft 40, threads 44 become engaged with drive means 60. In the preferred embodiment expandable collet 62 has threads 64 with which threads 44 become engaged. As shown in FIG. 2, collet 62 is in a non-expanded position which corresponds to an engaged position. With reference to FIG. 3, it is seen that collet 62 is sufficiently expandable to an expanded position which corresponds to a released non-feed position where the collet threads 64 are spaced from the shaft threads 44. There is at least one feed pin 66 attached to collet 62 for holding collet 62 in a substantially fixed axial position with respect to housing 20. The pin 66 also restricts rotation with respect to the housing 20. This is accomplished by having the pin 66 extend through an orifice 74 formed in feed body 120. Orifice 74 radially extends through feed body 120 and is sized for slip fit engagement with pin 66. Thus, feed pin 66 may move in a radial direction with respect to feed body 120 but it is substantially fixed in an axial and rotational or circumferential position relative to feed body 120.

In the preferred embodiment, means 80 for actuating said drive means 60 comprises an actuating sleeve 82 positioned by feed body 120 in axial alignment with feed shaft 40. With reference to FIG. 7 actuating sleeve 82 has a first interior diameter 81 corresponding to the exterior diameter of collet 62 in the non-expanded engaged position. Actuating sleeve 82 has a second interior diameter 83 adjacent the first interior diameter 81 corresponding to the exterior diameter of the collet 62 when the collet is in the expanded, released, non-feed position. There is at least one axially, elongated slot 84 formed in the actuating sleeve to accommodate the at least one feed pin 66 extending therethrough and into the orifice 74 of feed body 120. The actuating sleeve 82 is positioned by a bias means 70 so that the collet 62 remains positioned in the non-expanded or engaged position unless the bias of means 70 is overcome. An adjustable stop collar 90 is carried on feed shaft 40 and is positioned on the feed shaft to move therewith. When feed shaft 40 moves sufficiently in the direction of arrow 45, collar 90 will push the actuating sleeve 82 in an axial direction so that the collet 62 becomes aligned for expansion into said second diameter 83 of the actuating sleeve 82. This actuates the collet 62 into the released position when the feed shaft has moved a sufficient axial distance to force the tool bit a sufficient radial distance to sever the tube to be cut. The adjustable stop collar 90 may be positioned as by set screw 92 in a distance from the actuating collar which corresponds to the axial movement of the feed shaft required to force the tool holder 53 the required distance for cutting the tube. For tubes of the same size and wall thickness the position of collar 90 need not be reset each time. Various size tubes may also be accommodated because the distance is adjustable such that further travel may be permitted to cut clear through thicker tubing or a smaller distance may be set where the tube wall thickness is not as large.

Thus, when stop collar 90 engages biasing means 70 which is attached to actuating sleeve 82 the bias for normal positioning is overcome and the actuating sleeve moves relative to feed body 120 and relative to collet 62 in the axial direction. Slot 84 moves axially relative to pin 66 without moving pin 66. When the actuating sleeve moves a sufficient distance, expandable collet 62 expands into second diameter 83 of the actuating sleeve thereby disengaging threads 64 from threads 44. Once the threads are disengaged the biasing means 70 tend to restrain movement of actuating sleeve 82 at its new position. For example, biasing means 70 may comprise a spring loaded friction pin 71 to actuating sleeve 82 as through a cylinder 72. The head of the friction pin 71 rubs against feed body 120 thereby tending to restrain sleeve 82 at a given axial position relative to feed body 120.

Return spring 130 becomes compressed, as shown in FIG. 3, during the automatic cutting operation. When collet 62 disengages, return spring 130 expands to force feed shaft 40 back in a direction opposite to arrow 45. Thus, tool holder 53 is drawn down slide track 54 until return collar 132, which is pushed by spring 130 and which engages feed shaft 40, is sufficiently returned to contact actuating sleeve 82. Bias means 70 is overcome and sleeve 82 is pushed back to its beginning position as shown in FIG. 1.

As may be seen with reference again to FIG. 1 an unthreaded portion of feed shaft 40 becomes aligned with collet 62 and collet 62 rides inwardly on conical surface 87 of the actuating sleeve 82 forcing it again into its unexpanded position. Having an unthreaded portion of shaft 40 is advantageous because the momentum of the rotating tubular member 22 and feed shaft 40 in some instances may perpetuate rotation until collet 62 is compressed by actuating sleeve 82. This can result in partial engagement between threads 44 and 64, which may result in damaging the threads.

With reference to FIGS. 5 and 6, it is seen that expandable collet 62 has at least two truncated pie-shaped shoes 68 each having a portion of threads 64 formed on the inside thereof. In this embodiment springs 69 would be placed between the two adjacent interface surfaces 61 so that there is continuous pressure to expand the pie-shaped shoes. Each of the shoes would have a pin 66 extending therefrom with a corresponding orifice 74 in feed body 120 and a corresponding slot 84 in sleeve 82. The pins 66 position each shoe relative to each other shoe and relative to the feed body 120 axially and rotationally. The orifices 74, slots 84 and pins 66 are sized to permit radially inward and outward movement. The exterior surface of the collet 62 is preferably cylindrical and preferably has a nose surface 63 and a tail surface 67 larger than nose surface 63 with a conical surface 65 interconnecting the nose surface 63 and the tail surface 67.

In a preferred embodiment three pie-shaped shoes are used, each of which has a pin 66 extending radially therefrom with springs 69 between the interface surfaces 61 on each side of each shoe. Each of the shoes would have a portion of threads 64 formed thereon.

Where the collet has a nose surface 63 with a diameter smaller than the tail surface 67 then actuating sleeve 82 is preferably formed with a first interior cylindrical surface 81 corresponding to the diameter of nose surface 63 when the collet is in its non-expanded position. Also there would be a second interior surface 85 having a diameter corresponding to the exterior diameter tail portion 67 when the collet is in its expanded position. Also a third cylindrical surface 83 with a larger diameter corresponding to the diameter of the tail surface 67 when the collet is in its non-expanded position. Also it will be seen that third cylindrical surface 83 has a diameter corresponding to the diameter of the nose surface 63 when collate 62 is in its expanded position. Conical surface 87 would interconnect the first and third interior cylindrical surfaces 81 and 83 respectively and conical surface 89 would interconnect the third and second interior surfaces 83 and 85 respectively.

It has been found that occasionally the pressure on the tool becomes too great when it is being driven outwardly into cutting engagement. As, for example, where the tool is partially dulled or a hard spot in the material is encountered or any of a number of other machining problems resulting in increased tool pressure. To avoid such problems it is desirable to limit the maximum tool pressure. The present invention provides means 100 for limiting the maximum axial force applied through collet 62 to feed shaft 40 through threads 64 and 44 thereby limiting the maximum tool pressure. In the preferred embodiment, upon encountering high tool pressure, collet 62 remains in its non-expanded position with the threads 64 engaged with threads 44. However, feed body 120, which is normally held stationary with respect to stationary collar 140, is permitted to rotate by frictional slip between surface 124 and 146. A means 75 holds the first frictional slip surface 124 against the second frictional slip surface 146. Means 75 comprises a compression spring 76, one end 77 of which abuts against one shoulder 126 on said feed body 120. The other end 78 abuts against an interior shoulder 148 formed on the stationary collar 140. The first radially extending friction surface 124 is formed on a thread ring 110 which threads onto the feed body at variable distances to accomplish variable degrees of compression spring 76. Based upon a given spring constant the greater the compression the greater the normal force between surfaces 124 and 146 such that greater surface friction results to resist rotation of feed body 120 relative to stationary collar 140. When the tool force resisting outward radial movement of tool 12 increases, the axial force along shaft 40 likewise increases. The increased axial force increases the force between threads 64 and 44 thereby increasing the rotational force transmitted through pins 66 into feed body 120. When the rotational force exceeds the frictional force between surfaces 124 and 146 feed body 120 rotates relative to stationary collar 140 such that threads 64 rotate with feed shaft 40. Alternatively stated there is no relative motion between the feed shaft 40 and the collet 62 such that the shaft is not driven by threads 64 and 44. Therefore, force in the direction of arrow 45 is not increased and the force in the direction of arrow 47 on tool 12 is likewise not increased beyond the limit. The limit is determined by the friction between surfaces 124 and 146. This limit can be adjusted by compressing spring 76 to a greater or lesser degree such that cutting tools of various geometries can be accommodated to achieve maximum cutting efficiency without excessive tool pressure and without potential resultant tool breakage.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:
1. A tube cutter of the type which forces a tool bit against an interior tube wall as said bit is rotated to sever said tube from the inside, said tube cutter comprising:
 a. a housing for holding said tool bit at a distance from said tube end as said tool bit is rotated;
 b. a feed shaft means positioned by said housing for converting axial force along said feed shaft into radially directed pressure forcing said tool bit outwardly against said interior tube wall at said distance from said tube end as said tool bit is rotated;
 c. a drive means positioned by said housing for releasable driving engagement with said feed shaft means, said drive means having a released non-feed position and an engaged feed position in which axial force is applied to said feed shaft means;
 d. means positioned by said housing for actuating said drive means between said released position and said engaged position; and
 e. means positioned by said housing for limiting the maximum axial force applied by said drive means to said feed shaft means so that the maximum radial force on said tool bit is limited.

2. A tube cutter as in claim 1 wherein said housing comprises:
 a. a tubular member having a front portion and a back portion;
 b. a pilot means attached to said tubular member front portion for supporting said tubular member front portion centered in said tube to be cut;
 c. a spacing means adjustably attached to said tubular member back portion, spaced from said pilot means for engaging the end of said tube to be cut, for spacing said front portion a predetermined distance into said tube to be cut, and for centering said tubular member back portion;
 d. bearing means coupled to said tubular member back portion;
 e. a feed body coupled to said bearing means for rotatably supporting said tubular member therethrough and for carrying said means for actuating said drive means from said engaged position to said released position and having a first frictional slip surface thereon; and
 f. a stationary collar coupled to said feed body and having means attached thereto for preventing said stationary collar from rotating, which stationary collar has a second frictional slip surface frictionally interfaced with said first frictional slip surface on said feed body so that rotation of said feed body is restricted.

3. A tube cutter as in claim 1 wherein said means for actuating said drive means between said released position and said engaged position further comprises means for automatically actuating said drive means from said engaged position to said released position when said tube is severed.

4. A tube cutter as in claim 1 wherein said means for limiting the maximum axial force applied by said drive means to said feed shaft means further comprises means for adjusting the limit for the maximum axial force applied.

5. A tube cutter as in claim 1 further comprising:
 a. means attached to said feed shaft for converting axial force along said feed shaft into radially outward force on said tool bit;
 b. means between said feed shaft and, said tool bit for transmitting rotational force from said feed shaft to said tool bit while radially outward force is applied to said tool bit;
 c. rotational coupling means on said feed shaft for receiving rotational power from a source of rotational power; and
 d. threads on said feed shaft for engagement with said drive means so that a portion of rotational power received by said rotational coupling means is transformed into axial force along said feed shaft.

6. A tube cutter as in claim 5 further comprising:
 a. an expandable collet having threads at least partially therethrough for engagement with said threads on said feed shaft when said collet is in a non-expanded position corresponding to said engaged feed position and which collet is sufficiently expandable to an expanded position corresponding to said released non-feed position so that said collet threads are spaced from said threads on said feed shaft;
 b. at least one feed pin attached to said collet for holding said collet in a substantially fixed axial position with respect to said housing and restricted rotation with respect to said housing;

c. an actuating sleeve positioned by said feed body in axial alignment with said feed shaft, said actuating sleeve having a first interior diameter corresponding to the exterior diameter of said collet in said non-expanded engaged position and a second interior diameter adjacent said first interior diameter corresponding to the exterior diameter of said collet when it is in said expanded released non-feed position, and having at least one axially elongated slot formed in said actuating sleeve to accommodate said feed pin extending therethrough;

d. bias means for positioning said actuating sleeve with said collet in said engaged position; and e. an adjustable stop collar carried on said feed shaft positioned on said feed shaft to move therewith and to push said actuating sleeve in an axial direction so that said collet is aligned for expansion into said second diameter of said actuating sleeve thereby actuating said collet into said released position when said feed shaft has forced said tool bit a sufficient radial distance to sever said tube to be cut.

7. A tube cutter as in claim 6 wherein said means for adjusting the limit of the maximum axial force applied to said feed shaft comprises:

a. an orifice radially extending through said feed body sized for slip fit engagement with said feed pin attached to said collet;

b. a first radially extending friction surface around the circumference of said feed body;

c. a corresponding second radially extending friction surface on said stationary collar frictionally abutting against said first radially extending surface on said feed body; and d. means for holding said first and second friction surfaces against each other with adjustable pressure so that when the rotational forces transmitted from said feed shaft to said feed body through said collet and feed pin exceed the rotational frictional forces caused by the adjustable pressure between said first and second friction surfaces said feed body and said expandable collet will rotate with said feed shaft relative to said stationary collar until said frictional forces at said friction surfaces exceed the rotational forces being transmitted to said feed body from said feed shaft and through said collet and feed pins.

8. A tube cutter as in claim 7 wherein:

a. said means for holding said first frictional slip surface against said second frictional slip surface comprises a compression spring one end of which abuts against one shoulder formed on said feed body and the other end abuts against an interior shoulder formed on said stationary collar; and b. wherein said first radially extending friction surface on said feed body is formed on a threaded ring which threads onto said feed body to achieve variable degrees of compression of said compression spring.

9. A tube cutter as in claim 8 further comprising a return spring adapted for withdrawing said feed shaft in the axial direction when said collet is actuated to its released position so that said tool bit is automatically retracted when the tube is severed.

10. A tube cutter as in claim 9 wherein said means for converting axial force from said feed shaft into radial force on said tool bit comprises:

a. a wedge coupled at the front end of said feed shaft and having a slide track formed at an angle therein;

b. a tool bit holder having track follower means formed on one side thereof sized for sliding engagement with said angled slide track and having a smooth exterior surface radially outward from said feed shaft axis when said track follower is engaged in said angled slide track;

c. an orifice formed radially through said tubular member front portion sized uniformly corresponding to said exterior surface of said tool bit holder whereby axial motion of said feed shaft drives said tool bit holder up said angular slide track while it is pushed radially outward through said orifice thereby converting axial force on said feed shaft into radial force on said tool bit held by said tool bit holder.

11. A tube cutter as in claim 6 wherein said expandable collet further comprises:

a. at least two arcuate truncated pie-shaped shoes which fit together to form said collet, each shoe having a portion of the threads formed on the internal surface thereof for engagement with threads on said feed shaft;

b. at least two push type springs positioned between corresponding interface surfaces of said collet shoes so that said collet shoes are continuously biased radially apart from each other by said collet springs; and c. at least two of said feed pins with at least one of said feed pins attached to each of said collet shoes and radially extending therefrom.

12. A tube cutter as in claim 6 wherein said expandable collet further comprises:

a. at least three arcuate truncated pie-shaped shoes which fit together to form said collet, each shoe having a portion of the threads formed on the internal surface thereof for engagement with threads on said feed shaft;

b. at least three push type springs positioned between corresponding interface surfaces of said collet shoes so that said collet shoes are continuously biased radially apart from each other by said collet springs; and c. at least three of said feed pins with at least one of said feed pins attached to each of said collet shoes and radially extending therefrom.

13. A tube cutter as in claim 10 wherein said collet formed by said collet shoes further comprises:

a. a substantially cylindrical exterior nose surface having a first diameter;

b. a substantially cylindrical exterior tail surface having a second diameter relatively larger than said first diameter; and c. a substantially conical shaped surface interconnecting said cylindrical nose surface and said cylindrical tail surface.

14. A tube cutter as in claim 13 wherein said actuating sleeve comprises:

a. a first interior cylindrical surface having a diameter corresponding to the diameter of said cylindrical nose surface of said collet when said collet is in its engaged position;

b. a second interior cylindrical surface having a diameter corresponding to the diameter of said tail cylindrical surface of said collet when said collet is expanded into its released position;

c. a third interior cylindrical surface having a diameter corresponding to the diameter of said tail cylindrical surface of said collet when said collet is in said engaged position and wherein said diameter of said second interior cylindrical surface corresponds to the diameter of said cylindrical nose surface of said collet when said collet is in its released position;

d. a first interior conical surface interconnecting said first cylindrical surface to said third cylindrical interior surface; and e. a second interior conical surface interconnecting said second cylindrical interior surface to said third cylindrical interior surface.

* * * * *